US012656541B2

(12) United States Patent
Zhang

(10) Patent No.: US 12,656,541 B2
(45) Date of Patent: Jun. 16, 2026

(54) OPTICAL WAVEGUIDE LENS, HEAD-UP DISPLAY SYSTEM, AND VEHICLE

(71) Applicant: AAC OPTICS (CHANGZHOU) CO., LTD., Changzhou City (CN)

(72) Inventor: Biming Zhang, Changzhou (CN)

(73) Assignee: AAC OPTICS (CHANGZHOU) CO., LTD., Changzhou City (CN)

( * ) Notice: Subject to any disclaimer, the term of this patent is extended or adjusted under 35 U.S.C. 154(b) by 279 days.

(21) Appl. No.: 18/533,244

(22) Filed: Dec. 8, 2023

(65) Prior Publication Data

US 2024/0337782 A1    Oct. 10, 2024

Related U.S. Application Data

(63) Continuation of application No. PCT/CN2023/087227, filed on Apr. 10, 2023.

(51) Int. Cl.
*G02B 6/00*        (2006.01)
*F21V 8/00*        (2006.01)
(52) U.S. Cl.
CPC ......... *G02B 6/0016* (2013.01); *G02B 6/0026* (2013.01); *G02B 6/0036* (2013.01); *G02B 6/0055* (2013.01)
(58) Field of Classification Search
CPC .. G02B 6/0016; G02B 6/0026; G02B 6/0036; G02B 6/0055

USPC .......................................................... 385/129
See application file for complete search history.

(56)                References Cited

U.S. PATENT DOCUMENTS

| 2008/0212305 A1* | 9/2008 | Kawana | G02B 6/0053 |
| | | | 252/586 |
| 2019/0212557 A1* | 7/2019 | Waldern | G02B 27/0101 |
| 2021/0064082 A1* | 3/2021 | Yang | G02B 27/283 |

* cited by examiner

*Primary Examiner* — Jerry M Blevins
(74) *Attorney, Agent, or Firm* — Wiersch Law Group

(57)                ABSTRACT

The present disclosure provides an optical waveguide lens, a head-up display system, and a vehicle. The optical waveguide lens includes: a lens body including a first surface and a second surface opposite to each other in a first direction, a grating structure arranged on the lens body and including an incidence grating and an outgoing grating, and a reflective layer arranged on the lens body and on the first surface. The incidence grating is arranged on the first surface, and the outgoing grating is arranged on the second surface. The reflective layer aligns with the outgoing grating in the first direction. The reflective layer can reduce the risk of light leaving the lens body from portions without grating, thereby increasing the intensity of outputting light of the optical waveguide lens, and improving the imaging effect of the head-up display system and the interaction experience between the user and the vehicle.

20 Claims, 3 Drawing Sheets

OPTICAL WAVEGUIDE LENS, HEAD-UP DISPLAY SYSTEM, AND VEHICLE

CROSS REFERENCE TO RELATED APPLICATIONS

The present application is a continuation of PCT Patent Application No. PCT/CN2023/087227, filed Apr. 10, 2023, which is incorporated by reference herein in its entirety.

TECHNICAL FIELD

The present disclosure relates to the field of head-up display technology, and in particular to an optical waveguide lens, a head-up display system, and a vehicle.

BACKGROUND

A head-up display system of a vehicle is able to display information from a dashboard on a windshield to improve the interaction experience between user and the vehicle. A head-up display system in related technologies includes a display element arranged on the dashboard and a plurality of sets of curved speculums arranged between the display element and the windshield. The curved speculums reflect light a plurality of times to allow the light to enter eyes of the user. However, the large size and quantity of curved speculums require a large installation space, which makes the head-up display system occupy a large amount of interior space of the vehicle.

In order to solve the problem of large size of the head-up display system, the plurality of sets of curved speculums are usually replaced with a single optical waveguide lens. The light emitted by the display elements enters interior of lens body after diffraction by an incidence grating of the optical waveguide lens, and is casted on a surface of the windshield after total reflection inside the lens body and diffraction by an outgoing grating. Then, the light is reflected by the windshield to the eyes of the user to achieve the head-up display function. However, during the diffraction of the light by the outgoing grating, a part of the light propagates in a direction away from the windshield, causing reduced intensity of the light output by the optical waveguide lens, thereby resulting in a decrease in the light efficiency of the head-up display system.

Therefore, it is necessary to provide an optical waveguide lens, a head-up display system, and a vehicle having high intensity of outputting light.

SUMMARY

The present disclosure aims to provide an optical waveguide lens, a head-up display system, and a vehicle having high intensity of outputting light.

The technical solutions of the present disclosure are described below.

In the first aspect, some embodiments of the present disclosure provide an optical waveguide lens, including:

a lens body including a first surface and a second surface opposite to each other in a first direction;

a grating structure arranged on the lens body and including an incidence grating and an outgoing grating; the incidence grating is arranged on the first surface, the outgoing grating is arranged on the second surface, and the incidence grating misaligns with the outgoing grating in a second direction; and the first direction is parallel to a thickness direction of the lens body, and the second direction is perpendicular to the first direction; and a reflective layer arranged on the lens body and on the first surface, where the reflective layer aligns with the outgoing grating in the first direction.

As an improvement, at least a portion of a projection of the outgoing grating along the first direction overlaps with the reflective layer.

As an improvement, the reflective layer is a silver plated layer, an aluminum plated layer, a copper plated layer, or a gold plated layer.

As an improvement, the grating structure includes a plurality of diffraction grooves formed at intervals, there is an angle $\alpha$ between an extension direction of the plurality of diffraction grooves and the first direction, and a is larger than 0 degree and is less than 90 degrees.

As an improvement, a length of the incidence grating in the second direction is less than a length of the outgoing grating in the second direction.

As an improvement, the incidence grating is separable from the lens body and is fixedly connected to the lens body, or the incidence grating is integrally formed with the lens body; and/or the outgoing grating is separable from the lens body and is fixedly connected to the lens body, or the outgoing grating is integrally formed with the lens body.

In the second aspect, some embodiments of the present disclosure provide a head-up display system, including:

the optical waveguide lens as described above;

a display element arranged on a side of the optical waveguide lens on which the incidence grating is arranged in the first direction, where the display element aligns with the incidence grating and is configured to emit light to the optical waveguide lens; and a reflective element arranged on a side of the optical waveguide lens on which the outgoing grating is arranged in the first direction, where the reflective element aligns with the outgoing grating and is configured to reflect outgoing light from the outgoing grating to eyes of a person.

As an improvement, the head-up display system further includes a transmission mirror arranged between the display element and the optical waveguide lens in the first direction, and the transmission mirror is configured to convert the light emitted by the display element into parallel light. A propagation direction of the parallel light is parallel to the thickness direction of the lens body.

As an improvement, the display element is a silicon-based liquid crystal element or a digital light processing element.

In the third aspect, some embodiments of the present disclosure provide a vehicle, including:

a vehicle body having a windshield, where the vehicle body is enclosed with the windshield to form a cab;

wheels mounted on the vehicle body;

a dashboard installed on the vehicle body and inside the cab; and the head-up display system as described above;

the display element is arranged in the dashboard; and the reflective element is arranged on the windshield, or the windshield is configured as the reflective element.

The present disclosure has the following beneficial effects: when the head-up display system is in operation, user inside the cab can see the information displayed on the dashboard without looking down, thereby improving the interaction performance between the user and the vehicle. The head-up display system includes the optical waveguide lens having the reflective layer configured to reduce the risk of the light inside the lens body leaving the lens body from portions without any grating, thereby increasing the intensity of outputting light of the optical waveguide lens, and improving the imaging effect of the head-up display system and the interaction experience between the user and the vehicle.

REFERENCE NUMERALS

1—optical waveguide lens;
    11—lens body;
        111—first surface;
        112—second surface;
    12—grating structure;
        121—incidence grating;
        122—outgoing grating;
        123—diffraction grooves;
    13—reflective layer;
2—display element;
3—reflective element; and
4—transmission mirror.

DETAILED DESCRIPTION OF EMBODIMENTS

In the following, the present disclosure will be further illustrated in conjunction with the accompanying drawings and the embodiments.

The present disclosure provides a vehicle including a vehicle body, wheels, and a dashboard. The vehicle body has a windshield, and the vehicle body is enclosed with the windshield to form a cab. The wheels are mounted on the vehicle body, and a number of the wheels may be two, three, four or even more. The present disclosure does not impose specific limitations on the number of wheels or the specific type of the vehicle. The dashboard is installed on the vehicle body and inside the cab. The vehicle further includes a head-up display system configured to transmit the information displayed on the dashboard to eyes of user by reflection and diffraction of light. When the head-up display system is in operation, user inside the cab can see the information displayed on the dashboard without looking down, thereby improving the interaction performance between the user and the vehicle, and reducing the frequency of user looking down during driving. In this way, the user can focus attention on the front of the vehicle, thereby improving the safety of the vehicle.

Figure 1:
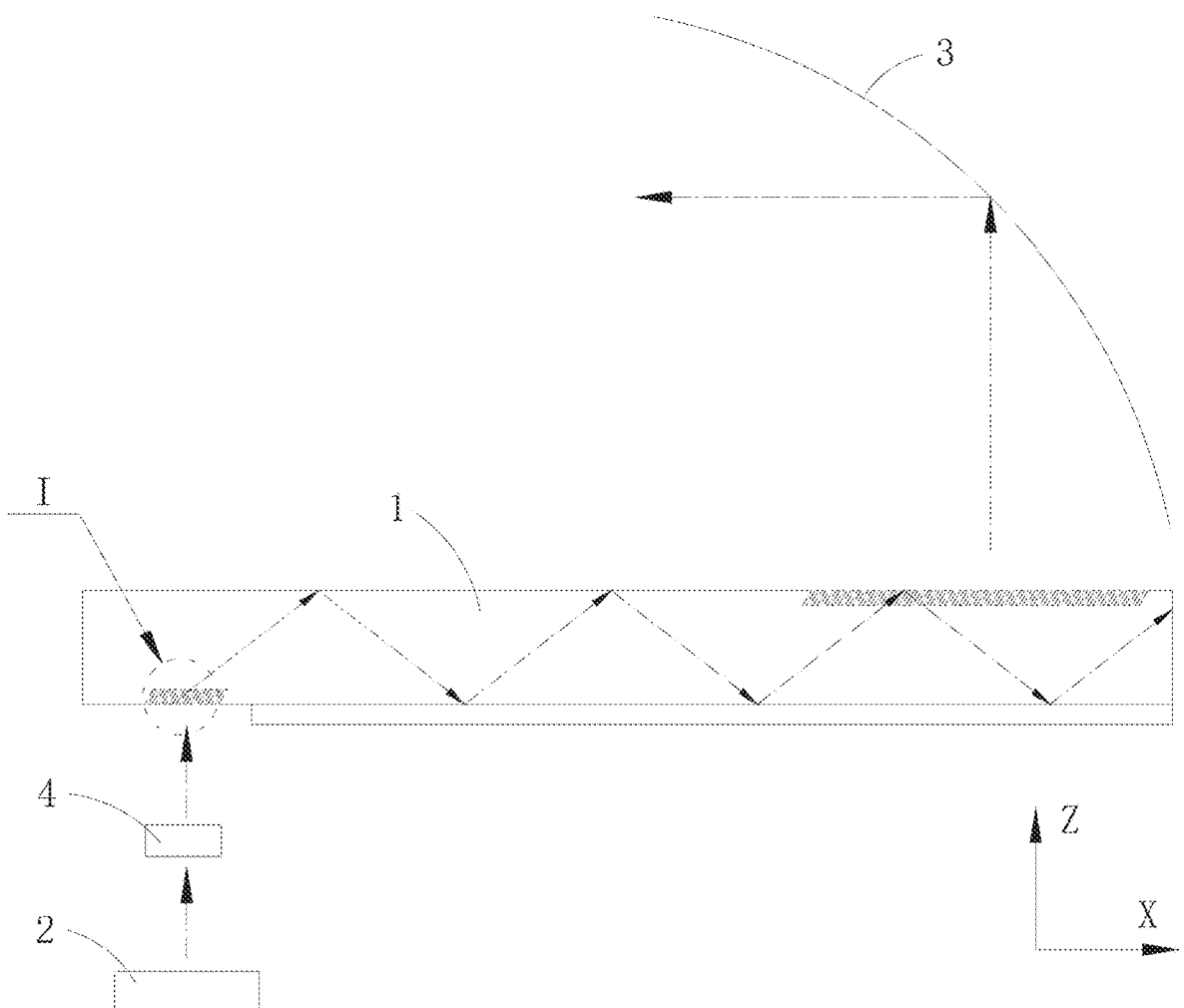
FIG. 1 is a schematic diagram of the light propagation path in the head-up display system according to some embodiments of the present disclosure.

In some embodiments, as shown in FIG. 1, the head-up display system includes an optical waveguide lens 1, a display element 2 and a reflective element 3. In a thickness direction of the optical waveguide lens 1, the display element 2 and the reflective element 3 are arranged on either sides of the optical waveguide lens 1, respectively. In a direction perpendicular to the thickness direction of the optical waveguide lens 1, the display element 2 misaligns with the reflective element 3. For ease of description, the thickness direction of the optical waveguide lens 1 is denoted as a first direction Z, and the arrangement direction of the display element 2 and the reflective element 3 is denoted as a second direction X, that is, the first direction Z is perpendicular to the second direction X. The second direction X is positioned in a plane enclosed by a length direction and a width direction of the optical waveguide lens 1. For ease of understanding, the second direction X in the present disclosure denotes the length direction of the optical waveguide lens 1.

The display element 2 is arranged in the dashboard and is configured to display information such as road conditions, fuel level of the vehicle, water temperature, or the like. When the head-up display system is in working, the display element 2 generates a target image and emits light which propagates to the optical waveguide lens 1. After diffraction and full reflection of the light by the optical waveguide lens 1, the light propagates to a surface of the reflective element 3. The reflective element 3 reflects the light, such that the light enters eyes of the user, thereby achieving the head-up display function.

In some embodiments, the reflective element 3 is installed on the windshield to facilitate maintenance and replacement of the reflective element 3, thereby reducing the maintenance cost. In some other embodiments, the windshield is configured as the reflective element 3, thereby reducing the overall number of parts and processing costs of the vehicle, and simplifying the installation cost of the reflective element 3.

Figure 2:
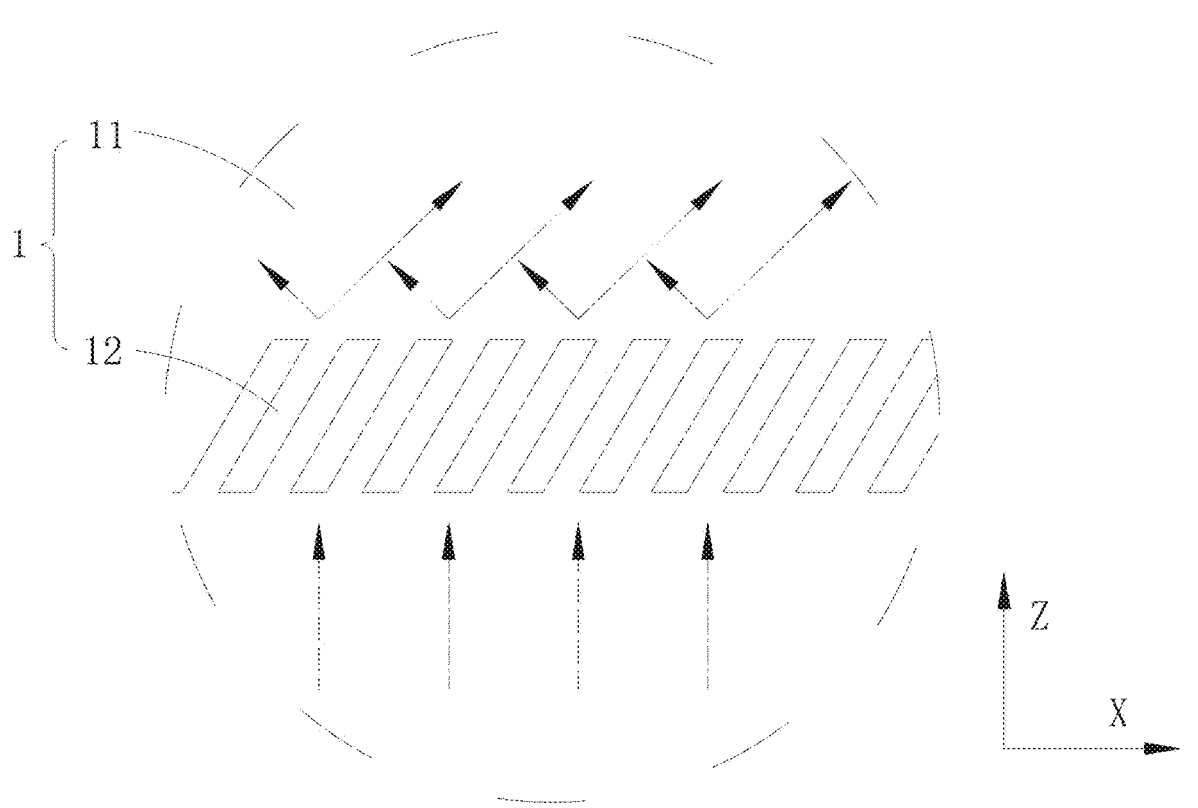
FIG. 2 is an enlarged view of the portion I in FIG. 1.

As shown in FIGS. 1 to 4, the optical waveguide lens 1 includes a lens body 11 and a grating structure 12 arranged on the lens body 11. The grating structure 12 includes an incidence grating 121 and an outgoing grating 122. The lens body 11 includes a first surface 111 and a second surface 112 opposite to each other in the first direction Z. The incidence grating 121 is arranged on the first surface 111, the outgoing grating 122 is arranged on the second surface 112, and the incidence grating 121 misaligns with the outgoing grating 122 in the second direction X. In the first direction Z, the display element 2 is arranged on a side of the first surface 111 of the optical waveguide lens 1 and aligns with the incidence grating 121, and the reflective element 3 is arranged on a side of the second surface 112 of the optical waveguide lens 1 and aligns with the outgoing grating 122. As shown in FIGS. 1 and 2, the light emitted by the display element 2 propagates to the incidence grating 121, diffracted by the incidence grating 121 and is coupled into the lens body 11. The light is then fully reflected by the lens body 11, propagates to the outgoing grating 122, and is diffracted by the outgoing grating 122. Then, the light leaves the lens body 11 and propagates to the surface of the reflective element 3, and finally is reflected to eyes of the user by the reflective element 3.

As shown in FIG. 1, the head-up display system further includes a transmission mirror 4 arranged between the display element 2 and the optical waveguide lens 1 in the first direction Z. The transmission mirror 4 is configured to convert the light emitted by the display element 2 into parallel light. A propagation direction of the parallel light is parallel to the first direction Z.

In some embodiments, the transmission mirror 4 is arranged between the display element 2 and the optical waveguide lens 1, to allow the light emitted by the display element 2 to propagate in parallel to the surface of the incidence grating 121. In this way, the consistency of propagation direction of the light inside the lens body 11 can be improved, thereby improving the imaging effect of the head-up display system.

Moreover, the display element 2 is a silicon-based liquid crystal element or a digital light processing element, to increase the flexibility in arrangement of the display element 2.

When the display element 2 is a silicon-based liquid crystal element, the display element 2 has a relatively high resolution, and when the display element 2 is a digital light processing element, the display element 2 has relatively high clarity. Therefore, by configuring the display element 2 as a silicon-based liquid crystal element or digital light processing element, it is conducive to improvement of the imaging effect of the head-up display system.

Figure 3:
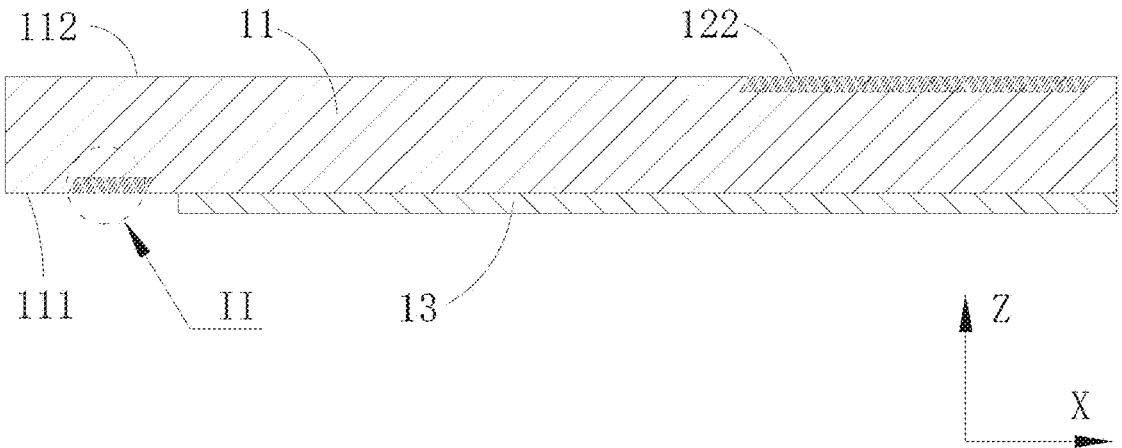
FIG. 3 is a sectional view of the optical waveguide lens according to some embodiments of the present disclosure.
Figure 4:
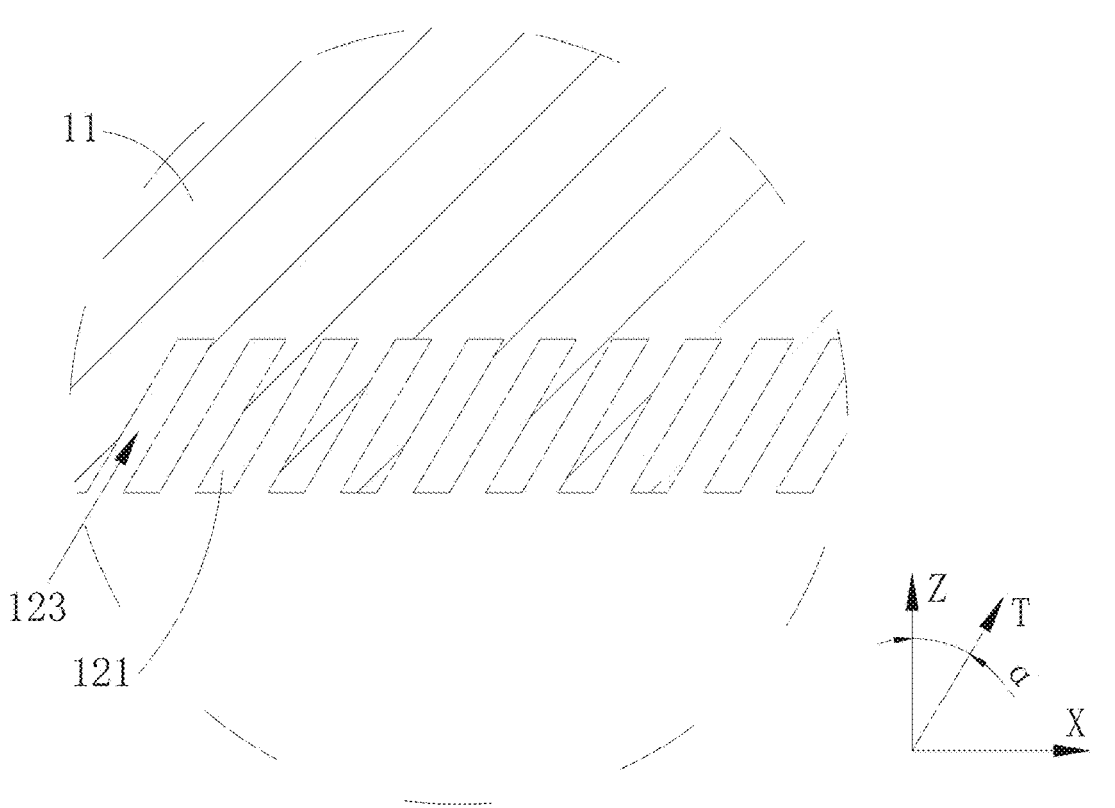
FIG. 4 is an enlarged view of the portion II in FIG. 3.

As shown in FIGS. 3 and 4, the grating structure 12 includes a plurality of diffraction grooves 123 extending obliquely along a third direction T. There is an angle α between the third direction T and the first direction Z, and a is larger than 0 degree and is less than 90 degrees. The angle between the third direction T and the first direction Z may be 9°, 15°, 26°, 37°, 42°, 45°, 55°, 67°, 85°, or the like.

By setting the angle between the third direction T and the first direction Z to be larger than 0 degree and is less than 90 degrees, it facilitates the diffraction of light by the grating structure 12, thereby improving the working stability and reliability of the grating structure 12.

In some embodiments, a length of the incidence grating 121 in the second direction X is less than a length of the outgoing grating 122 in the second direction X.

As shown in FIG. 1, the light entering the lens body 11 through the incidence grating 121 is fully reflected by the lens body 11 to the outgoing grating 122. By setting the size of the incidence grating 121 in the second direction X to be less than the size of the outgoing grating 122 in the second direction X, the risk that the light inside the lens body 11 cannot completely propagate out of the outgoing grating 122 can be reduced, thereby improving the utilization, by the optical waveguide lens 1, of the light output by the display element 2, and increasing intensity of the light output by the optical waveguide lens 1.

In some embodiments, the grating structure 12 is separable from the lens body 11 and is fixedly connected to the lens body 11. In other words, the incidence grating 121 and the outgoing grating 122, as respective individual parts, are installed on the lens body 11, to facilitate the installation, maintenance, and replacement of the incidence grating 121 and the outgoing grating 122. In some other embodiments, the grating structure 12 is integrally formed with the lens body 11. In other words, the incidence grating 121 is formed by directly etching on the first surface 111 of the lens body 11, and the outgoing grating 122 is formed by etching on the second surface 112, in order to improve steadiness of the connection between the grating structure 12 and the lens body 11.

Figure 5:
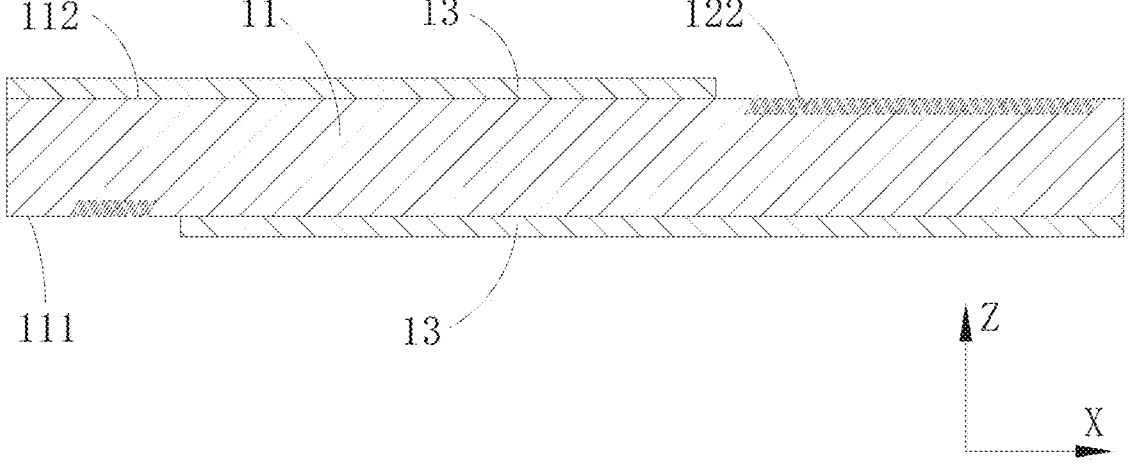
FIG. 5 is a sectional view of another optical waveguide lens according to some embodiments of the present disclosure.

As shown in FIGS. 3 and 5, the optical waveguide lens 1 further includes a reflective layer 13 applied on the first surface 111 and/or the second surface 112 of the lens body 11. The reflective layer 13 is made of an opaque material to reduce the risk of the light inside the lens body 11 leaving the lens body 11 from portions without any grating. In this way, the risk of decreased intensity of the light output at the outgoing grating 122 can be reduced, thereby increasing the intensity of outputting light of the optical waveguide lens 1, and improving the imaging effect of the head-up display system and the interaction experience between the user and the vehicle.

In some embodiments, the reflective layer 13 is a silver plated layer, an aluminum plated layer, a copper plated layer, or a gold plated layer. In other words, the reflective layer 13 is made of silver, aluminum, copper, gold, or other opaque materials. The present disclosure does not impose specific limitations on the materials of the reflective layer 13 to increase flexibility in the types of the reflective layer 13.

In some embodiments, there may be one, two, three or even more reflective layers 13. The present disclosure does not impose specific limitations on the number of the reflective layers 13. When there are a plurality of reflective layers 13, materials of the plurality of reflective layers 13 may be different from or same as each other.

In some embodiments, the reflective layer 13 is arranged on the first surface 111 and aligns with the outgoing grating 122 in the first direction Z, and at least a portion of a projection of the outgoing grating 122 along the first direction Z overlaps with the reflective layer 13. Alternatively or in addition, the reflective layer 13 is arranged on the second surface 112 and aligns with the incidence grating 121 in the first direction Z, and at least a portion of a projection of the incidence grating 121 along the first direction Z overlaps with the reflective layer 13.

By setting at least a portion of the projection of the incidence grating 121 and/or at least a portion of the projection of the outgoing grating 122 to overlap with the reflective layer 13, during diffraction of light by the grating structure 12, decrease in intensity of light due to a part of the light leaving the lens body 11 at positions opposite to the grating structure 12 can be reduced, thereby further increasing the intensity of the light diffracted by the grating structure 12. In this way, intensity of the light output by the optical waveguide lens 1 can be further increased, thereby further improving the imaging effect of the head-up display system and the interaction experience between the user and the vehicle.

The above mentioned are only the embodiments of the present disclosure. It should be pointed out that for those skilled in the art, improvements can be made without departing from the inventive concept of the present disclosure, but these improvements are all within the scope of protection of the present disclosure.

What is claimed is:

1. An optical waveguide lens, comprising:
   a lens body, including a first surface and a second surface opposite to each other in a first direction;
   a grating structure, arranged on the lens body and including an incidence grating and an outgoing grating, wherein the incidence grating is arranged on the first surface, the outgoing grating is arranged on the second surface, and the incidence grating misaligns with the outgoing grating in a second direction, and wherein the first direction is parallel to a thickness direction of the lens body, and the second direction is perpendicular to the first direction; and
   a reflective layer, including a first reflective layer and a second reflective layer,
   wherein the first reflective layer is arranged on the lens body and on the first surface, wherein the first reflective layer at least partially aligns with the outgoing grating in the first direction;
   wherein the second reflective layer is arranged on the lens body and on the second surface, wherein the second reflective layer at least partially aligns with the incidence grating in the first direction;
   wherein the first reflective layer at least partially aligns with the second reflective layer in the first direction.

2. The optical waveguide lens according to claim 1, wherein at least a portion of a projection of the outgoing grating along the first direction overlaps with the reflective layer.

3. The optical waveguide lens according to claim 2, wherein the incidence grating is separable from the lens body and is fixedly connected to the lens body, or the incidence grating is integrally formed with the lens body; and/or wherein the outgoing grating is separable from the lens body and is fixedly connected to the lens body, or the outgoing grating is integrally formed with the lens body.

4. The optical waveguide lens according to claim 1, wherein the reflective layer is a silver plated layer, an aluminum plated layer, a copper plated layer, or a gold plated layer.

5. The optical waveguide lens according to claim 4, wherein the incidence grating is separable from the lens body and is fixedly connected to the lens body, or the incidence grating is integrally formed with the lens body; and/or wherein the outgoing grating is separable from the lens body and is fixedly connected to the lens body, or the outgoing grating is integrally formed with the lens body.

6. The optical waveguide lens according to claim 1, wherein the grating structure includes a plurality of diffraction grooves formed at intervals, there is an angle α between an extension direction of the plurality of diffraction grooves and the first direction, and a is larger than 0 degree and is less than 90 degrees.

7. The optical waveguide lens according to claim 6, wherein the incidence grating is separable from the lens body and is fixedly connected to the lens body, or the incidence grating is integrally formed with the lens body; and/or wherein the outgoing grating is separable from the lens body and is fixedly connected to the lens body, or the outgoing grating is integrally formed with the lens body.

8. The optical waveguide lens according to claim 1, wherein a length of the incidence grating in the second direction is less than a length of the outgoing grating in the second direction.

9. The optical waveguide lens according to claim 8, wherein the incidence grating is separable from the lens body and is fixedly connected to the lens body, or the incidence grating is integrally formed with the lens body; and/or wherein the outgoing grating is separable from the lens body and is fixedly connected to the lens body, or the outgoing grating is integrally formed with the lens body.

10. The optical waveguide lens according to claim 1, wherein the incidence grating is separable from the lens body and is fixedly connected to the lens body, or the incidence grating is integrally formed with the lens body; and/or wherein the outgoing grating is separable from the lens body and is fixedly connected to the lens body, or the outgoing grating is integrally formed with the lens body.

11. A head-up display system, comprising:

an optical waveguide lens, including:

a lens body, including a first surface and a second surface opposite to each other in a first direction;

a grating structure, arranged on the lens body and including an incidence grating and an outgoing grating, wherein the incidence grating is arranged on the first surface, the outgoing grating is arranged on the second surface, and the incidence grating misaligns with the outgoing grating in a second direction, and wherein the first direction is parallel to a thickness direction of the lens body, and the second direction is perpendicular to the first direction; and a reflective layer, including a first reflective layer and a second reflective layer, wherein the first reflective layer is arranged on the lens body and on the first surface, wherein the first reflective layer at least partially aligns with the outgoing grating in the first direction;

wherein the second reflective layer is arranged on the lens body and on the second surface, wherein the second reflective layer at least partially aligns with the incidence grating in the first direction;

wherein the first reflective layer at least partially aligns with the second reflective layer in the first direction;

a display element, arranged on a side of the optical waveguide lens on which the incidence grating is arranged in the first direction, wherein the display element aligns with the incidence grating and is configured to emit light to the optical waveguide lens; and a reflective element, arranged on a side of the optical waveguide lens on which the outgoing grating is arranged in the first direction, wherein the reflective element aligns with the outgoing grating and is configured to reflect outgoing light from the outgoing grating to eyes of a person.

12. The head-up display system according to claim 11, further including a transmission mirror arranged between the display element and the optical waveguide lens in the first direction, wherein the transmission mirror is configured to convert the light emitted by the display element into collimated light.

13. The head-up display system according to claim 11, wherein the display element is a silicon-based liquid crystal element or a digital light processing element.

14. The head-up display system according to claim 11, wherein at least a portion of a projection of the outgoing grating along the first direction overlaps with the reflective layer.

15. The head-up display system according to claim 11, wherein the reflective layer is a silver plated layer, an aluminum plated layer, a copper plated layer, or a gold plated layer.

16. The head-up display system according to claim 11, wherein the grating structure includes a plurality of diffraction grooves formed at intervals, there is an angle α between an extension direction of the plurality of diffraction grooves and the first direction, and a is larger than 0 degree and is less than 90 degrees.

17. The head-up display system according to claim 11, wherein a length of the incidence grating in the second direction is less than a length of the outgoing grating in the second direction.

18. The head-up display system according to claim 11, wherein the incidence grating is separable from the lens body and is fixedly connected to the lens body, or the incidence grating is integrally formed with the lens body; and/or

wherein the outgoing grating is separable from the lens body and is fixedly connected to the lens body, or the outgoing grating is integrally formed with the lens body.

19. A vehicle, comprising:

a vehicle body, having a windshield, wherein the vehicle body is enclosed with the windshield to form a cab;

wheels, mounted on the vehicle body;

a dashboard, installed on the vehicle body and inside the cab; and a head-up display system, including:

an optical waveguide lens, including:

a lens body, including a first surface and a second surface opposite to each other in a first direction;

a grating structure, arranged on the lens body and including an incidence grating and an outgoing grating, wherein the incidence grating is arranged on the first surface, the outgoing grating is arranged on the second surface, and the incidence grating misaligns with the outgoing grating in a second direction, and wherein the first direction is parallel to a thickness direction of the lens body, and the second direction is perpendicular to the first direction; and a reflective layer, including a first reflective layer and a second reflective layer, wherein the first reflective layer is arranged on the lens body and on the first surface, wherein the first reflective layer at least partially aligns with the outgoing grating in the first direction;

wherein the second reflective layer is arranged on the lens body and on the second surface, wherein the second reflective layer at least partially aligns with the incidence grating in the first direction;

wherein the first reflective layer at least partially aligns with the second reflective layer in the first direction;

a display element, arranged on a side of the optical waveguide lens on which the incidence grating is arranged in the first direction, wherein the display element aligns with the incidence grating and is configured to emit light to the optical waveguide lens; and a reflective element, arranged on a side of the optical waveguide lens on which the outgoing grating is arranged in the first direction, wherein the reflective element aligns with the outgoing grating and is configured to reflect outgoing light from the outgoing grating to eyes of a person;

wherein the display element is arranged in the dashboard; and wherein the reflective element is arranged on the windshield, or the windshield is configured as the reflective element.

20. The vehicle according to claim 19, wherein the head-up display system further includes a transmission mirror arranged between the display element and the optical waveguide lens in the first direction, and wherein the transmission mirror is configured to convert the light emitted by the display element into collimated light.

* * * * *